March 8, 1949. H. R. MILLER 2,463,991
SAFETY DEVICE FOR AIRPLANES
Filed Sept. 29, 1944
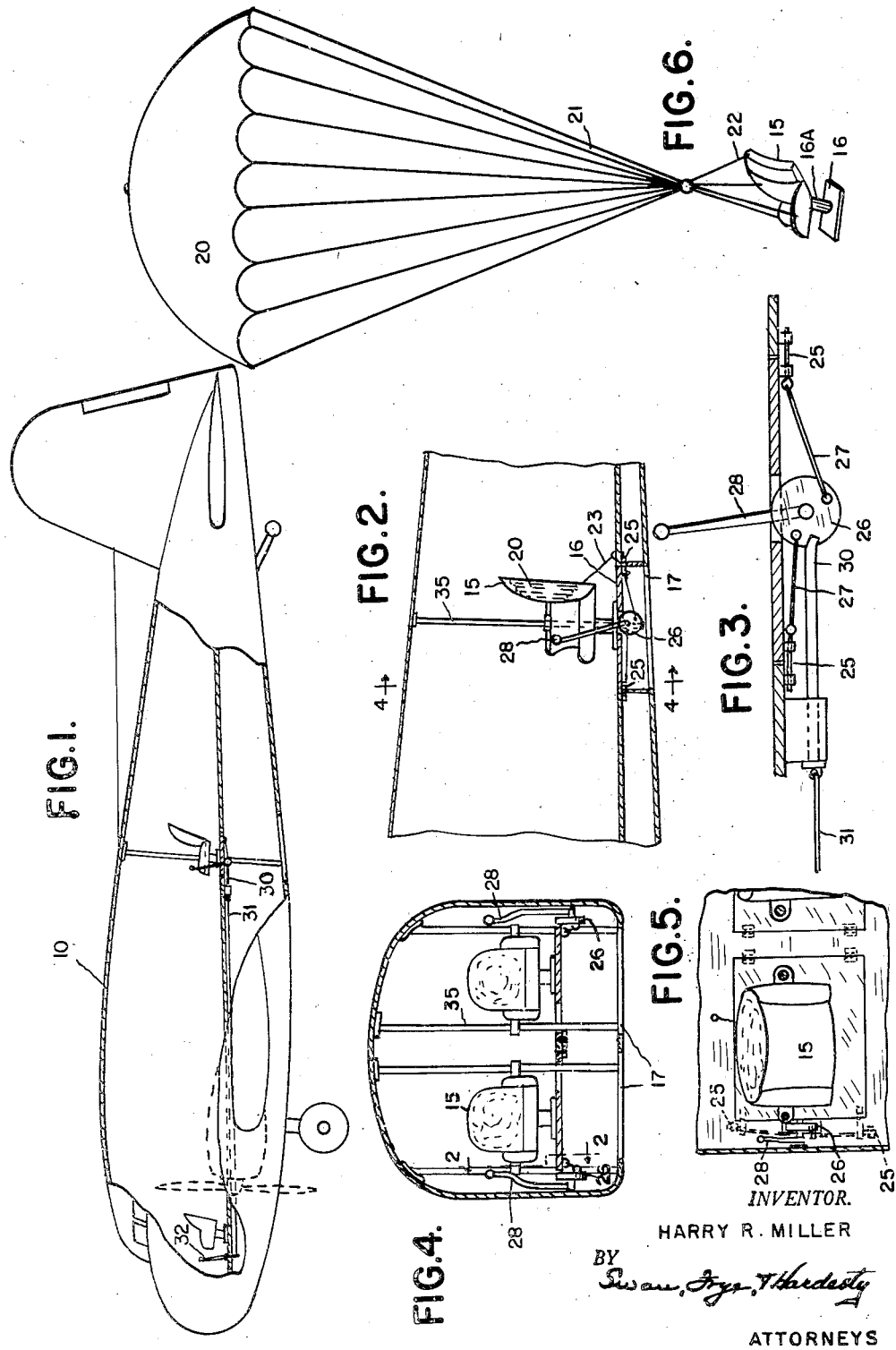
INVENTOR.
HARRY R. MILLER
BY
ATTORNEYS Patented Mar. 8, 1949

2,463,991

UNITED STATES PATENT OFFICE 2,463,991

SAFETY DEVICE FOR AIRPLANES

Harry R. Miller, Grosse Pointe, Mich.

Application September 29, 1944, Serial No. 556,407

2 Claims. (Cl. 244—141)

The present invention relates to safety means for airplanes or other air transport vehicles and has among its objects means for the emergency discharge of passengers while the vehicle is in flight.

Another object of the invention is safety means which is under the joint control of the pilot or other officer and the passenger so that a passenger may not cause his discharge unless the pilot or officer has first provided therefor.

Another object is a safety means for the parachuting of a passenger from the vehicle without the necessity of the usual complicated harness.

Another object is means for absorbing shock when the passenger lands and for preventing his being dragged along the ground by the parachute.

Still other objects will readily occur to those skilled in the art upon reference to the following description and the accompanying drawings in which Fig. 1 is a more or less diagrammatic representation, in side elevation with parts in section, of a plane equipped with the safety means.

Fig. 2 is an enlargement of a portion of Fig. 1 as if on line 2—2 of Fig. 4.

Fig. 3 is a further enlargement of a portion of Fig. 2.

Fig. 4 is a sectional view on line 4—4 of Fig. 2.

Figure 5 is a plan view of one of the seats, and

Fig. 6 is a view indicating a seat being supported by a parachute after ejection.

As indicated in the drawings, an otherwise conventional passenger transport plane 10 may be equipped with the safety means embodying the present invention, the main difference in construction being in providing the bottom or other suitable portion of the fuselage with suitable openings for the ejection of the seat containing a passenger.

In the present means, each passenger seat 15 will be carried upon a removable floor section 16 which is mounted over one of the openings 17 in the hull of the ship. This opening 17 will preferably be normally closed by a suitable hinged door (not shown).

In the seat structure, preferably in the back, will be packed a parachute 20 with its cords 21 fixed to the seat structure as at 22 and its rip cord 23 fixed to a suitable part of the plane structure.

As indicated best in Figs. 2 and 3, each floor section 16 will be held in normal position by means of latches 25, releasable through the partial rotation of a disc 26 connected to the latches by links 27 and rotatable by means of a lever 28 located adjacent the seat.

These discs 26, however, are normally fixed against rotation by a latch 30 controlled by the pilot and operable by him by means of a cable 31 and lever 32. These latches 25 and 30 must both be released in order to eject the seat and passenger and latch 30 must be released first. This, of course, gives control to the pilot.

The operation of the invention is more or less obvious from the foregoing but it should be noted that, whether or not an emergency ejection is necessary exists, is left to the judgment of the pilot. If he decides that such is the case, the passengers will first be instructed to fasten their safety belts and when this has been done, the latches 30 will be released. These may all be released simultaneously or the cable 31 may be so connected to the latches 30 as to release them serially from back to front or vice versa. As the latches 30 are released, each passenger in his order, may then release his individual seat by moving his lever 28.

While simple mechanical latches and operating means have been shown, it is obvious that other forms of holding and operating means are within the purview of the invention.

Further, in order to guide the seats through their respective openings, suitable guide rods 35 may be used.

It will be noted that each seat unit supported by a parachute includes its floor section 16 and the seat supporting pedestal 16A. In the latter may be suitable shock absorbing means so that the shock of landing will be lessend. The corners of the floor section 16 may also be expected to serve as a ground anchor against dragging after landing.

Now having described the invention and the preferred embodiment thereof, it is to be understood that said invention is to be limited not to the specific details herein set forth, but only by the scope of the claims which follow.

I claim:

1. A passenger safety device for airplanes consisting of an ejectable seat unit including a seat and a permanently attached parachute, releasable means for said unit whereby to permit ejection of said unit, said releasable means consisting of seat-occupant operated means and pilot operated means, said occupant operated means being operable only after operation of the pilot operated means, and means for automatically opening said parachute upon ejection of said unit.

2. In an airplane, an ejectable floor section, a seat mounted thereon, a parachute packed in said seat and fixed thereto, latch means normally maintaining said section in place, other latch means normally preventing release of the first mentioned latch means, said other latch means being inaccessible to an occupant of said seat, means accessible to a seat occupant for releasing the first latch means after release of said other latch means, and means for automatically opening said parachute after ejection of said floor section and seat.

HARRY R. MILLER.

REFERENCES CITED

The following references are of record in the file of this patent:

UNITED STATES PATENTS

| Number | Name | Date |
|---|---|---|
| 190,998 | Arnold | May 22, 1877 |
| 1,628,098 | Abreau | May 10, 1927 |
| 1,716,597 | Mueller | June 11, 1929 |
| 1,831,055 | Berg | Nov. 10, 1931 |
| 1,909,697 | McBeth | May 16, 1933 |

FOREIGN PATENTS

| Number | Country | Date |
|---|---|---|
| 331,810 | Italy | Nov. 16, 1935 |
| 713,098 | France | Aug. 10, 1931 |
| 829,331 | France | Mar. 28, 1939 |